(12) United States Patent
Yoshimura

(10) Patent No.: US 6,359,736 B1
(45) Date of Patent: Mar. 19, 2002

(54) LENTICULAR LENS SHEET

(75) Inventor: Osamu Yoshimura, Niigata (JP)

(73) Assignee: Kuraray Co., Ltd., Kurashiki (JP)

( * ) Notice: Subject to any disclaimer, the term of this patent is extended or adjusted under 35 U.S.C. 154(b) by 0 days.

(21) Appl. No.: 09/622,581

(22) PCT Filed: Dec. 20, 1999

(86) PCT No.: PCT/JP99/07153

§ 371 Date: Aug. 21, 2000

§ 102(e) Date: Aug. 21, 2000

(87) PCT Pub. No.: WO00/38006

PCT Pub. Date: Jun. 29, 2000

(30) Foreign Application Priority Data

Dec. 21, 1998 (JP) .......................................... 10-362619

(51) Int. Cl.[7] .......................... G02B 27/10; G05B 21/60
(52) U.S. Cl. ...................... 359/619; 359/454; 359/621
(58) Field of Search ............................... 359/619, 621, 359/454, 455, 460, 742, 741, 743

(56) References Cited

U.S. PATENT DOCUMENTS

| | | | | |
|---|---|---|---|---|
| 3,705,757 A | * | 12/1972 | Huber | 359/453 |
| 4,380,365 A | * | 4/1983 | Gross | 385/33 |
| 5,581,407 A | * | 12/1996 | Mittani et al. | 359/619 |
| 5,687,024 A | | 11/1997 | Yoshimura et al. | 359/455 |
| 5,699,131 A | * | 12/1997 | Aoki et al. | 348/822 |
| 6,101,031 A | | 8/2000 | Yoshimura et al. | 359/456 |
| 6,251,566 B1 | * | 6/2001 | Brosh et al. | 430/321 |

FOREIGN PATENT DOCUMENTS

| | | | |
|---|---|---|---|
| JP | 2-72341 | 3/1990 | |
| JP | 2-140735 | 5/1990 | |
| JP | 9-15727 | 1/1997 | |
| JP | 2000241890 A | * 9/2000 | ........... G03B/21/62 |

* cited by examiner

*Primary Examiner*—Georgia Epps
*Assistant Examiner*—Saeed Seyrafi
(74) *Attorney, Agent, or Firm*—Oblon, Spivak, McClelland, Maier & Neustadt, P.C.

(57) ABSTRACT

A lenticular lens sheet has arcuate-shaped warping such that the optical output lens side is the concave side, where, considering a chord B1 that connects points P2 and P3 to each other which are points on this approximate curve of arcurate shape and are of distance 150 mm from center line CL, and between which a distance is 300 mm, a distance to this chord B1 from the point P1 where this approximate curve and this center line intersect is represented by S0, and, considering a chord B2 that connects an upper edge UE of this approximate curve to a point P4 300 mm from the upper edge in the downwards direction, a distance to this chord B2 from the point P6 where the perpendicular from the central point P5 of this chord B2 intersects this approximate curve is represented by S1, and, considering a chord B3 that connects a lower edge LE of this approximate curve to a point P7 300 mm from the lower edge in the upwards direction, a distance to this chord B3 from the point P9 where the perpendicular from the central point P8 of this chord B3 intersects this approximate curve is represented by S2, respectively, there exists a relationship satisfying S0>S1>0 and S0>S2>0.

6 Claims, 5 Drawing Sheets

1A

LENTICULAR LENS SHEET

TECHNICAL FIELD

The present invention relates to a lenticular lens sheet used in the screen of for example rear projection type television sets.

BACKGROUND ART

Conventionally, as the screen of a rear projection type television set, a combination of a lenticular lens sheet and a Fresnel lens sheet is known. In such screens, two or more lens sheets made of plastics of different thickness and material are combined. The magnitude of elongation and contraction of the lens sheets in response to ambient temperature/humidity changes is different, and this may therefore result in the occurrence of a gap between the lens sheets. Accordingly, as shown in FIG. 5, occurrence of a gap between the lens sheets is prevented by causing the two lens sheets to adhere by utilizing the resilience of the lens sheets, by applying warping to the lenticular lens sheet and Fresnel lens sheet such that the degree of warping is more gentle in the case of the Fresnel lens sheet 2 than in the case of the lenticular lens sheet 1. Applying the warping to the lens sheet is commonly effected by placing a flat lens sheet in a prescribed mold and then heating it. The degree of warping (arcuate curvature R) of the lenticular lens sheet is the same both in the vicinity of the center and in the vicinity of the upper and lower edges. In the mode of use of these two lens sheets as a screen, as shown in FIG. 4, which is given in explanation of the present invention, the upper edges and lower edges are held fixed by a screen frame 6. When such lens sheets to which warping has been applied are assembled in a television set using a screen in which they are fixed in a frame, and this is transported by being loaded onto for example a truck, rubbing may occur between the two lens sheets due to vibration etc during transportation. Rubbing was particularly likely to occur at the upper and lower edges of the screen, where scraping off of the top portions of the Fresnel lens or the lenticular lens could severely impair image quality.

As counter-measures for this, there have been proposed a screen (see Japanese Patent Application Laid-open No. H2-93531), in which the top portions of the Fresnel lens are flattened, and a screen (see Japanese Utility Model Application Laid-open No. H1-97327) shaped approximately as a spherical surface in which the cross-sectional shape of the lenticular lens sheet (warped shape) is a combination of curved lines and straight lines.

However, when making the top portions of the Fresnel lens flat as a countermeasure for rubbing between the lenticular lens sheet and Fresnel lens sheet, in order not to impair the image quality of the screen, the restriction had to be imposed of flattening only the minute portion at the Fresnel lens tips through which the emitted light did not pass, without altering the shapes of the other portions, through which the emitted light passed. Typically, therefore the width of the flat part which was provided was only a few $\mu$m, which was insufficient to offer the benefit of preventing scraping due to rubbing of the two lens sheets.

In a circular Fresnel lens sheet, the lens grooves are arranged concentrically. Also, the metal mold for a circular Fresnel lens sheet is manufactured by machining for example a brass plate using a cutting tool; typically, machining is performed with respect to one groove while rotating the brass plate or the like. Consequently, it is not possible to provide the flat parts of the Fresnel lens top portions selectively exclusively in the vicinity of the upper and lower edges of the screen, and even regions in the vicinity of the center line (height direction) of the lens sheet offset towards the left and right edges, where flat parts of the Fresnel lens top portions are basically unnecessary, must be machined; there was thus the problem that considerable time was required for machining of the metal mold.

On the other hand, in the case of a screen shaped approximately as a spherical surface in which the cross-sectional shape of the lenticular lens sheet (warped shape) was a combination of curved lines and straight lines, in a high-humidity environment, it was found that a gap occurred between the lenticular lens sheet and Fresnel lens sheet in the region where the cross-sectional shape of the lenticular lens sheet was linear. In addition, in regions where the cross-sectional shape (warped shape) of the lenticular lens sheet was curved, scraping sometimes occurred of the Fresnel lens top portions and lenticular lens top portions due to rubbing between the two lens sheets during transportation etc. It was therefore not possible to solve simultaneously the problems of eliminating a gap between the lenticular lens sheet and Fresnel lens sheet and of preventing scraping due to rubbing of the two lens sheets.

DISCLOSURE OF THE INVENTION

The present invention was made in view of the above problems. An object thereof is to provide a lenticular lens sheet wherein, even when a screen is constructed by combining this with a Fresnel lens sheet, there is little occurrence of gaps between it and the Fresnel lens sheet and there is little occurrence of scraping of the lens top portions due to rubbing against the Fresnel lens sheet. In a lenticular lens sheet (1A) according to the present invention that solves the above problem, wherein the cross-sectional shape of the lenticular lens sheet in the vertical direction of the screen has warping, such that the optical output lens side is the concave side, and such that its upper part and lower part are of roughly symmetrical arcuate shape with respect to the center line (CL in FIG. 1) in the height direction of the lenticular lens sheet, considering a chord (B1) that connects two points (P2, P3) to each other which are points on the approximate curve of arcuate shape of this lenticular lens sheet and are of distance 150 mm from this center line (CL) and between which a distance is 300 mm, a distance to this chord (B1) from the point (P1) where this approximate curve and this center line intersect is represented by S0, considering a chord (B2) that connects an upper edge (UE) of the approximate curve of this lenticular lens sheet to a point (P4) on the approximate curve of the lenticular lens sheet at a distance of 300 mm from the upper edge (UE) in the downwards direction, a distance to this chord (B2) from the point (P6) where the perpendicular from the central point (P5) of this chord (B2) intersects the approximate curve of this lenticular lens sheet is represented by S1, considering a chord (B3) that connects a lower edge (LE) of the approximate curve of this lenticular lens sheet to a point (P7) on the approximate curve of the lenticular lens sheet at a distance of 300 mm from the lower edge (LE) in the upwards direction, the distance to this chord (B3) from the point (P9) where the perpendicular from the central point (P8) of this chord (B3) intersects the approximate curve of this lenticular lens sheet is represented by S2, respectively, and S0, S1 and S2 satisfy the following expression (1) and expression (2):

$$S0 > S1 > 0 \quad (1)$$

$$S0 > S2 > 0 \quad (2).$$

Herein, the approximate curve of the arcuate shape of the lenticular lens sheet is expressed as the curve of the arcuate shape obtained when the lenticular lens sheet is gradually lowered onto a suitable board from a condition in which it was suspended with the left side face (or the right side face) of the lenticular lens sheet supported so that no force is applied thereto in the horizontal direction (i.e. a condition rotated by 90° from its condition of use), and the side face of the lenticular lens sheet on the opposite side to the side face that is supported abuts this board.

Preferably, in addition to the above expressions (1) and (2), the magnitude of the warping expressed by the above S0, S1 and S2 satisfies the following expressions (3) to (5):

$$5(mm) \leq S0 \leq 25(mm) \quad (3)$$

$$0(mm) < S1 < 25(mm) \quad (4)$$

$$0(mm) < S2 < 25(mm) \quad (5).$$

Also, a screen according to the present invention comprises a lenticular lens sheet as described above and a Fresnel lens sheet arranged on the optical input side face of this lenticular lens sheet, this Fresnel lens sheet having warping such that its optical output side is concave and in which this warping is more gentle than the warping of this lenticular lens sheet.

FIG. 2 shows a diagrammatic perspective view of a lenticular lens sheet according to the present invention and a Fresnel lens sheet combined with this. As shown in FIG. 2, typically lenticular lens sheet 1A according to the present invention is provided with warping such that the optical output side where the optical output side lens 3 and black stripes 4 are provided constitutes the concave side and the optical input side lens 5 constitutes the convex side. FIG. 3 shows a diagram of the respective warping shapes of a lenticular lens sheet according to the present invention and a Fresnel lens sheet combined with this.

As shown in FIG. 3, although the Fresnel lens sheet 2 that is combined with lenticular lens sheet 1A has warping such that its optical output side is a concave side, the degree of this warping is more gentle than that of lenticular lens sheet 1A. Specifically, if, for the optical input side face of the lenticular lens sheet 1A, the distance from the tangent L1 in the vertical direction of the screen at its center to the upper and lower edges of the lenticular lens sheet 1A is taken as D1 and, for the optical input side face of the Fresnel lens sheet 2, the distance from the tangent L2 in the vertical direction of the screen at its center to the upper and lower edges of the Fresnel lens sheet 2 is taken as D2, and the magnitude of the warping is expressed by D1 or D2, D2 s preferably ½0 to ⅓ of D1.

For the lenticular lens sheet according to the present invention, the warping (S1, S2) nearer to the upper and lower edges is smaller than the warping (S0) in the middle region of the lenticular lens sheet.

When a lenticular lens sheet and Fresnel lens sheet are combined as a screen, as shown in FIG. 4, their upper edges and lower edges are fixed to and supported by a screen frame 6. With the lenticular lens sheet of the present invention, in which the warping (S1, S2) nearer the upper and lower edges is smaller than the warping (S0) in the middle region of the lenticular lens sheet, the pressing force acting at the points of contact between the lenticular lens sheet surface and the Fresnel lens sheet surface in the vicinity of the screen frame at the upper and lower edges can be lowered, making it possible to suppress scraping of the Fresnel lens top portions occurring in this region. Also, in the vicinity of the center of the lens sheet, where a gap may easily occur between the lenticular lens sheet and Fresnel lens sheet, the pressing force between the two lens sheets can be made high, so occurrence of gaps between the lenticular lens sheets and Fresnel lens sheets is infrequent, just as in the case where flat lenticular lens sheets are employed to which warping is not applied.

BEST MODE FOR CARRYING OUT THE INVENTION

A specific description of the present invention is given below with reference to Examples.

WORKING EXAMPLES

Example 1

Figure 1:
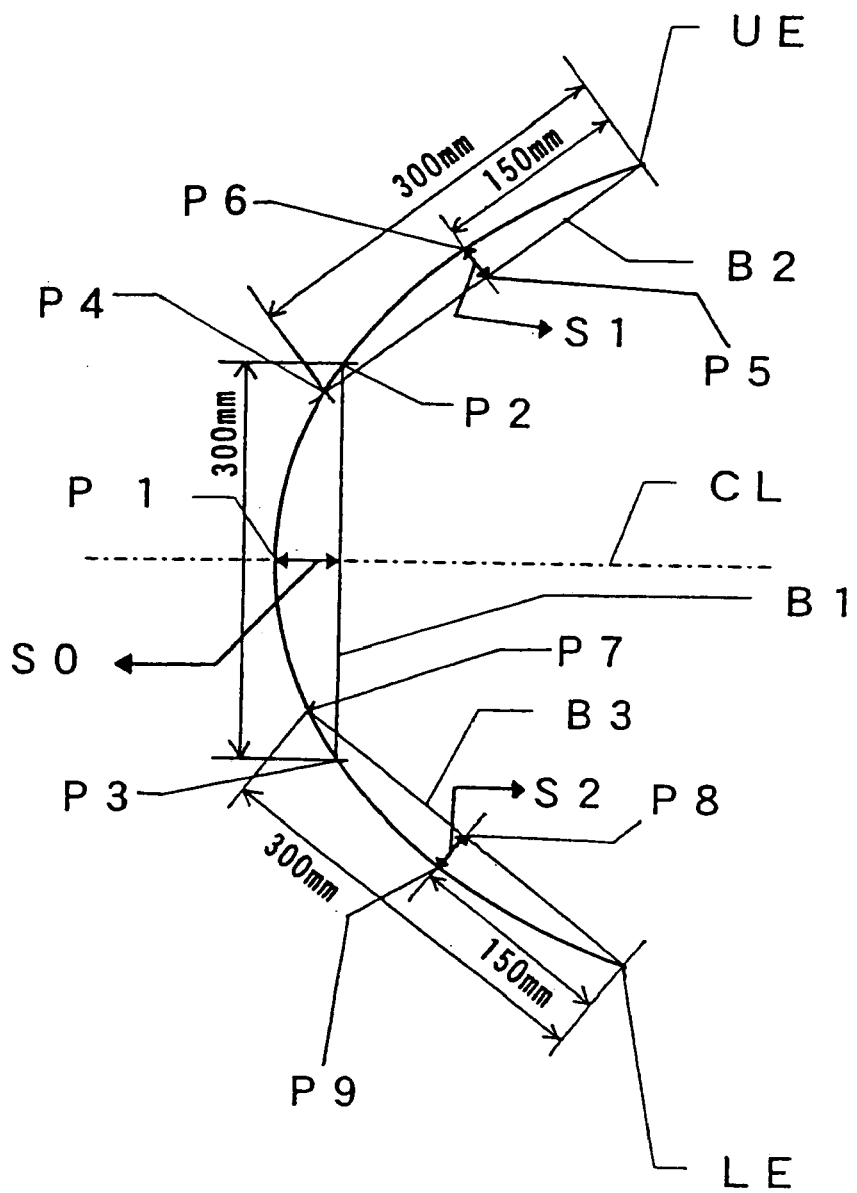
FIG. 1 is a view showing the approximation to a curve of the cross-sectional shape of the screen in the vertical direction of an arcuate lenticular lens sheet to which warping according to the present invention has been applied.
Figure 2:
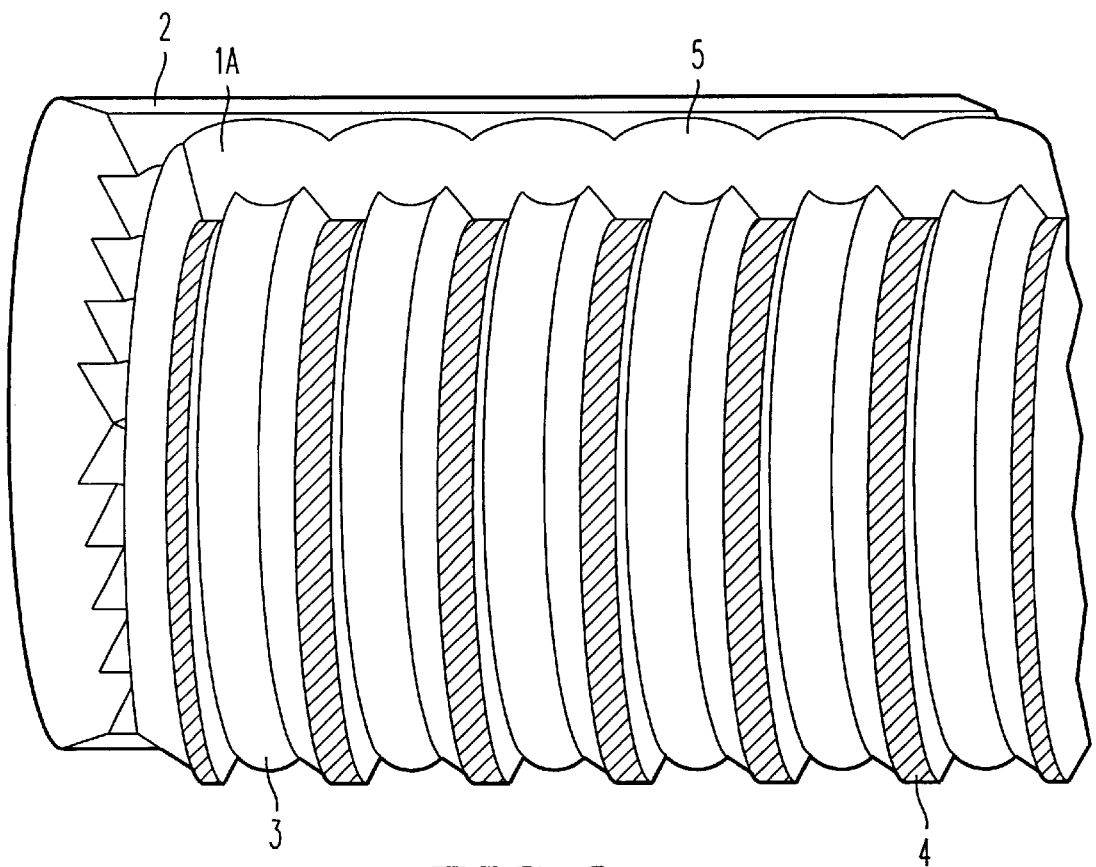
FIG. 2 is a diagrammatic perspective view of a lenticular lens sheet according to the present invention and a Fresnel lens sheet combined therewith.
Figure 3:
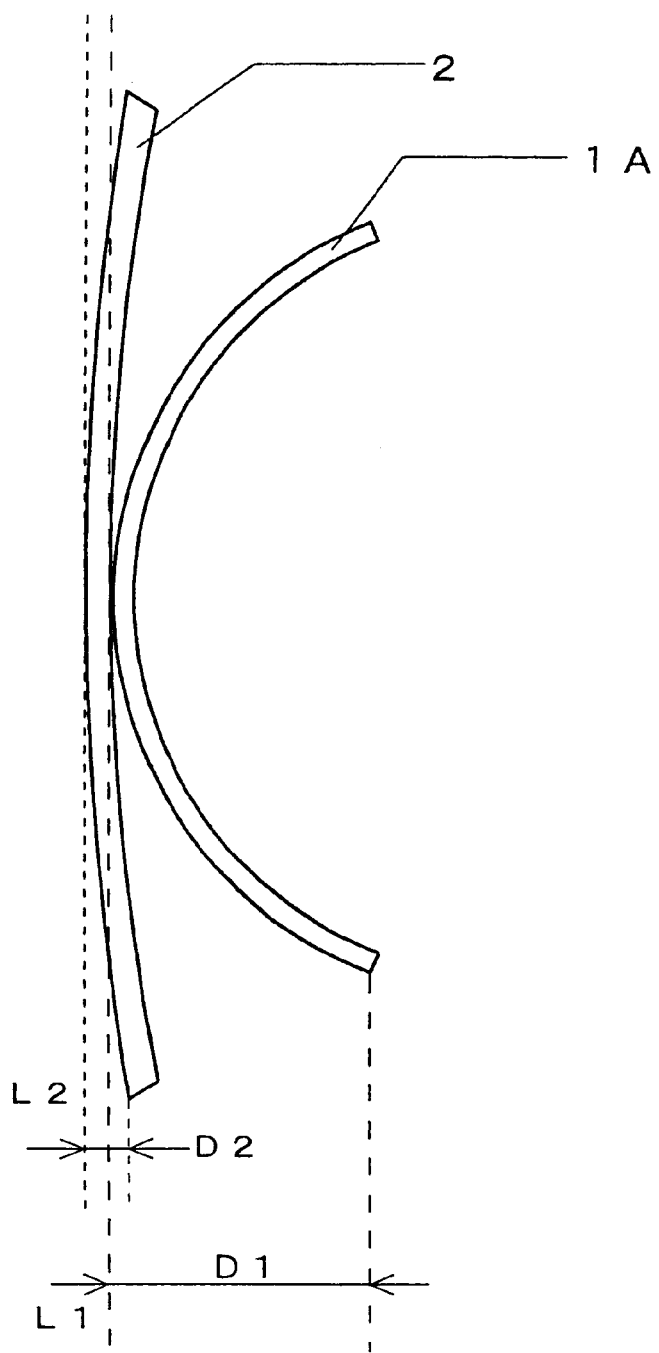
FIG. 3 is a diagram illustrating the warping of the cross-sectional shape in the vertical direction of a lenticular lens sheet according to the present invention and a Fresnel lens sheet combined therewith, respectively.
Figure 4:
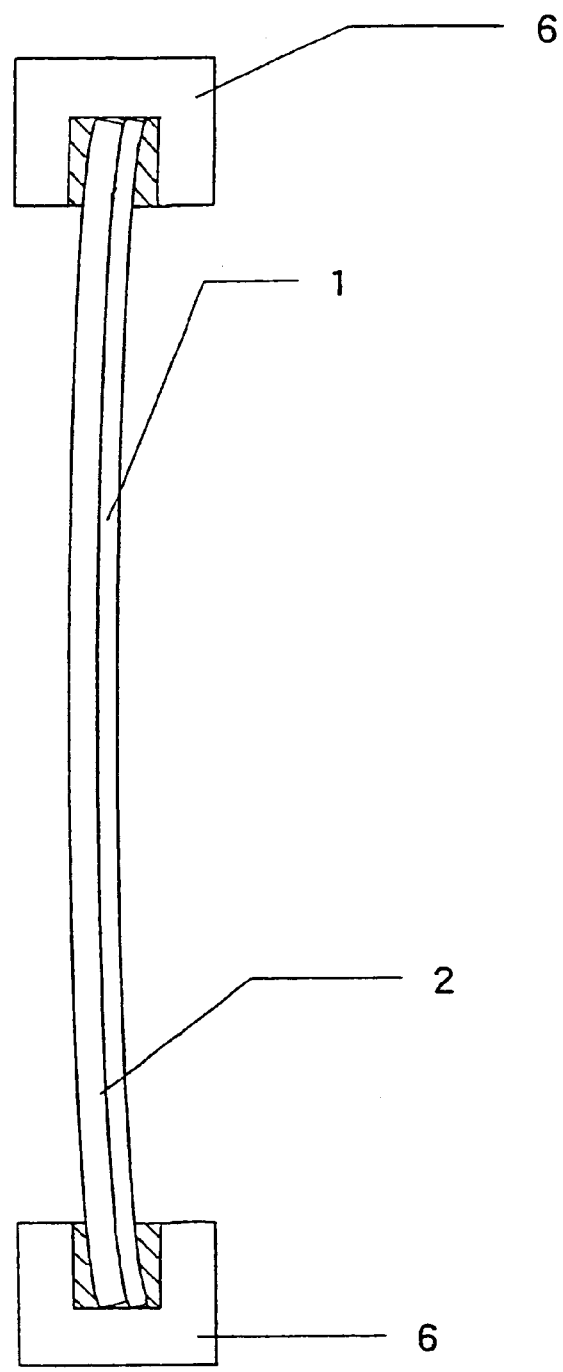
FIG. 4 is a view showing how a lenticular lens sheet and Fresnel lens sheet are fixed in a screen frame.
Figure 5:
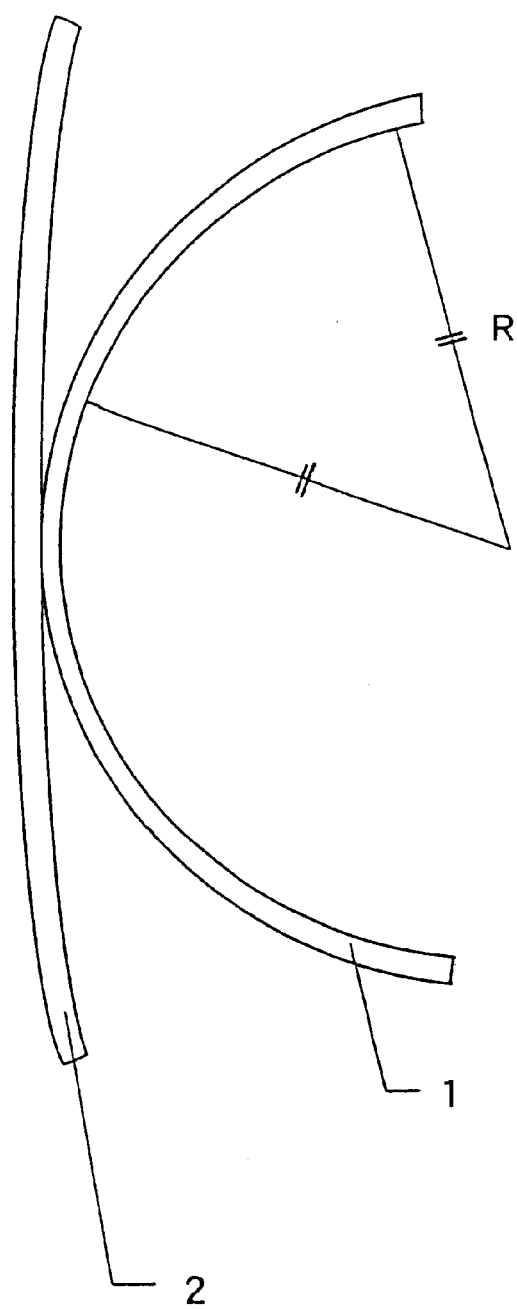
FIG. 5 is a diagram illustrating the warping of the cross-sectional shape in the vertical direction of the screen of a prior art lenticular lens sheet and a Fresnel lens sheet combined therewith, respectively.

Warping was applied to a Fresnel lens sheet manufactured by forming a Fresnel lens pattern on a sheet of thickness 2 mm made of acrylic-styrene copolymer resin by the method of photopolymerization using a UV-hardening resin, such that the image light input side was convex (the magnitude of the convex warping of the Fresnel lens sheet (D2 in FIG. 3) was 10 mm). A lenticular lens sheet having warping of S0 of 14.7 mm, S1 and S2 of 9.2 mm as defined above was manufactured by inserting a lenticular lens sheet of thickness 0.9 mm made of acrylic resin into a warping mold and heating.

When a Fresnel lens sheet and lenticular lens sheet as described above were set in position in the frame of a television set such that the face that was formed with the Fresnel lens was on the side of the lenticular lens sheet, and a long-distance transportation test was conducted in which this was loaded on to a truck and transported for about 1000 km, no scraping of the Fresnel lens top portions or lenticular lens top portions was found to have occurred. Also, no gap occurred between the lenticular lens sheet and Fresnel lens sheet when this television set was placed for 48 hours in an environment of 40° C. and 75%.

Example 2

A lenticular lens sheet having warping of S0 of 9.0 mm, Si and S2 of 7.5 mm as defined above was manufactured by inserting a lenticular lens sheet of thickness 0.9 mm made of acrylic resin into a warping mold different from that of Example 1 and heating. When this lenticular lens sheet was set in position in the frame of a television set together with a Fresnel lens sheet identical with that of Example 1, the face where the Fresnel lens shape was formed being on the side of the lenticular lens sheet, and a long-distance transportation test and high-temperature high-humidity test were conducted in the same way as in Example 1, in each case excellent results were obtained just as in Example 1.

Example 3

A lenticular lens sheet having warping of S0 of 22.0 mm, S1 and S2 of 17.0 mm as defined above was manufactured by inserting a lenticular lens sheet of thickness 0.9 mm made of acrylic resin into a warping mold different from that of Examples 1 and 2 and heating. When this lenticular lens sheet was set in position in the frame of a television set together with a Fresnel lens sheet identical with that of Examples 1 and 2, the face where the Fresnel lens shape was formed being on the side of the lenticular lens sheet, and a long-distance transportation test and high-temperature high-humidity test were conducted in the same way as in Examples 1 and 2, in each case excellent results were obtained just as in Examples 1 and 2.

Example 4

A lenticular lens sheet having warping of S0 of 26.5 mm, S1 and S2 of 25.0 mm as defined above was manufactured by inserting a lenticular lens sheet of thickness 0.9 mm made of acrylic resin into a warping mold different from that of Examples 1 to 3 and heating. When this lenticular lens sheet was set in position in the frame of a television set together with a Fresnel lens sheet identical with that of Examples 1 to 3, the face where this Fresnel lens shape was formed being on the side of the lenticular lens sheet, and a long-distance transportation test was conducted in the same way as in Examples 1 to 3, slight scraping of the top and bottom edges of the screen occurred. When the image quality of this rear projection type television was observed, it was found that no patterns or shadows impairing image quality were produced i.e. there was no problem in practical use. Also, when a high-temperature high-humidity test was performed in the same way as in the case of Examples 1 to 3, just as in the case of Examples 1 to 3, no gap between the two lens sheets occurred.

Comparative Example 1

A lenticular lens sheet having warping of each of S0, S1 and S2 as defined above of 11.5 mm was manufactured by inserting a lenticular lens sheet of thickness 0.9 mm made of acrylic resin into a warping mold different from that of the Examples and heating. When this lenticular lens sheet was set in position in the frame of a television set together with a Fresnel lens sheet identical with that of the Examples, the face where the Fresnel lens shape was formed being on the side of the lenticular lens sheet, and a long-distance transportation test was conducted in the same way as in the Examples, scraping occurred at the upper and lower edges of the screen. When the image quality of this rear projection type television was observed, it was found that patterns or shadows impairing image quality were produced in the places where scraping had occurred, resulting in severe impairment of image quality. However, when a high-temperature high-humidity test was performed in the same way as in the case of the Examples, no gap between the two lens sheets occurred.

Comparative Example 2

A lenticular lens sheet having warping of S0 of 10.5 mm, S1 and S2 of −1.0 mm as defined above (that is, it had warping in the opposite direction to that in the vicinity of the center, such that the optical input side of the lens was convex) was manufactured by inserting a lenticular lens sheet of thickness 0.9 mm made of acrylic resin into a warping mold different from that of the Examples and heating. This lenticular lens sheet was set in position in the frame of a television set together with a Fresnel lens sheet identical with that of the Examples, the face where the Fresnel lens shape was formed being on the side of the lenticular lens sheet. In this condition, a gap of 2 mm occurred between the lenticular lens sheet and Fresnel lens sheet. When this television set was placed for 48 hours in an environment of 40° C. and 75%, the gap between the two lens sheets expanded to 12 mm. On observing the image of this television set, the phenomena of strong double images and deviation of convergence in the places where gaps were seen occurred. However, when a long-distance transportation test was conducted in the same way as in the Examples, no scraping at the upper and lower edges of the screen occurred.

Comparative Example 3

A lenticular lens sheet having warping of S0 of 24.0 mm, S1 and S2 of 27.0 mm as defined above was manufactured by inserting a lenticular lens sheet of thickness 0.9 mm made of acrylic resin into a warping mold different from that the Examples and heating. When this lenticular lens sheet was set in position in the frame of a television set together with a Fresnel lens sheet identical with that of the Examples, the face where the Fresnel lens shape was formed being on the side of the lenticular lens sheet, and a long-distance transportation test was conducted in the same way as in the Examples, scraping occurred at the top portions of the lenticular lens and at the top portions of the Fresnel lens at the upper and lower edges of the screen. On observing the image quality of this rear projection type television, it was found that patterns or shadows adversely affecting image quality were produced in the places where the scraping had occurred, causing severe impairment of image quality. A high-temperature high-humidity test was conducted in the same way as in the Examples, but no gaps between the two sheets occurred.

The following Table 1 summarizes the results of the various tests and the magnitude of the warping in the above Examples and Comparative Examples.

TABLE 1

|  | Example 1 | Example 2 | Example 3 | Example 4 | Comparative Example 1 | Comparative Example 2 | Comparative Example 3 |
| --- | --- | --- | --- | --- | --- | --- | --- |
| S0 (mm) | 14.7 | 9.0 | 22.0 | 26.5 | 11.5 | 10.5 | 24.0 |
| S1, S2 (mm) | 9.2 | 7.5 | 17.0 | 25.0 | 11.5 | −1.0 | 27.0 |

TABLE 1-continued

|  | Example 1 | Example 2 | Example 3 | Example 4 | Comparative Example 1 | Comparative Example 2 | Comparative Example 3 |
|---|---|---|---|---|---|---|---|
| S0–S1 (S2) (mm) | 5.5 | 1.5 | 5.0 | 1.5 | 0 | 11.5 | −3.0 |
| Long-distance transportation test | None | None | None | Slight (creating no practical problem in terms of image quality) | Yes | None | Yes |
| High-temperature high-humidity test | None | None | None | None | None | Yes (gap occured on assembly) | None |

INDUSTRIAL APPLICABILITY

With a lenticular lens sheet according to the present invention, even when constituted as a screen by combining with a fresnel lens, a gap seldom occurs between this and the fresnel lens sheet and, furthermore, scraping of the lens top portions due to rubbing against the fresnel lens sheet seldom occurs.

What is claimed is:

1. A lenticular lens sheet, wherein the cross-sectional shape of the lenticular lens sheet in the vertical direction of the screen has warping, such that the optical output lens side is the concave side, and such that its upper part and lower part are of roughly symmetrical arcuate shape with respect to the center line in the height direction of the lenticular lens sheet, considering a chord that connects two points to each other which are points on the approximate curve of arcuate shape of this lenticular lens sheet and are of distance 150 mm from this center line, and between which a distance is 300 mm, a distance to this chord from the point where this approximate curve and this center line intersect is represented by S0, considering a chord that connects an upper edge of the approximate curve of this lenticular lens sheet to a point on the approximate curve of the lenticular lens sheet at a distance of 300 mm from the upper edge in the downwards direction, a distance to this chord from the point where the perpendicular from the central point of this chord intersects the approximate curve of this lenticular lens sheet is represented by S1, considering a chord that connects a lower edge of the approximate curve of this lenticular lens sheet to a point on the approximate curve of the lenticular lens sheet at a distance of 300 mm from the lower edge in the upwards direction, a distance to this chord from the point where the perpendicular from the central point of this chord intersects the approximate curve of this lenticular lens sheet is represented by S2, respectively, and S0, S1 and S2 satisfy the following expression (1) and expression (2):

$$S0 > S1 > 0 \quad (1)$$

$$S0 > S2 > 0 \quad (2).$$

2. The lenticular lens sheet of claim 1 wherein the above S0, S1 and S2 satisfy the following expressions (1) to (5):

$$S0 > S1 > 0 \quad (1)$$

$$S0 > S2 > 0 \quad (2)$$

$$5(mm) \leq S0 \leq 25(mm) \quad (3)$$

$$0(mm) < S1 < 25(mm) \quad (4)$$

$$0(mm) < S2 < 25(mm) \quad (5).$$

3. A screen comprising a lenticular lens sheet according to claim 1 and a Fresnel lens sheet arranged on the optical input side face of this lenticular lens sheet, this Fresnel lens sheet having warping such that its optical output side is concave and in which this warping is more gentle than the warping of this lenticular lens sheet.

4. The screen according to claim 3 wherein if, for the optical input side face of the lenticular lens sheet, the distance from the tangent in the vertical direction of the screen at its center to the upper and lower edges of the lenticular lens sheet is taken as D1 and, for the optical input side face of the Fresnel lens sheet, the distance from the tangent in the vertical direction of the screen at its center to the upper and lower edges of the Fresnel lens sheet is taken as D2, and the magnitude of the warping is expressed by D1 or D2, D2 is $\frac{1}{20}$ to $\frac{1}{3}$ of D1.

5. A screen comprising a lenticular lens sheet according to claim 2 and a Fresnel lens sheet arranged on the optical input side face of this lenticular lens sheet, this Fresnel lens sheet having warping such that its optical output side is concave and in which this warping is more gentle than the warping of this lenticular lens sheet.

6. The screen according to claim 5 wherein if, for the optical input side face of the lenticular lens sheet, the distance from the tangent in the vertical direction of the screen at its optical input side face of the Fresnel lens sheet, the distance from the tangent in the vertical direction of the screen at its center to the upper and lower edges of the Fresnel lens sheet is taken as D2, and the magnitude of the warping is expressed by D1 or D2, D2 is $\frac{1}{20}$ to $\frac{1}{3}$ of D1.

* * * * *